April 16, 1929.  C. W. GASKELL  1,709,394
OIL GUARD FOR IMPRESSION CYLINDERS
Filed Sept. 22, 1927
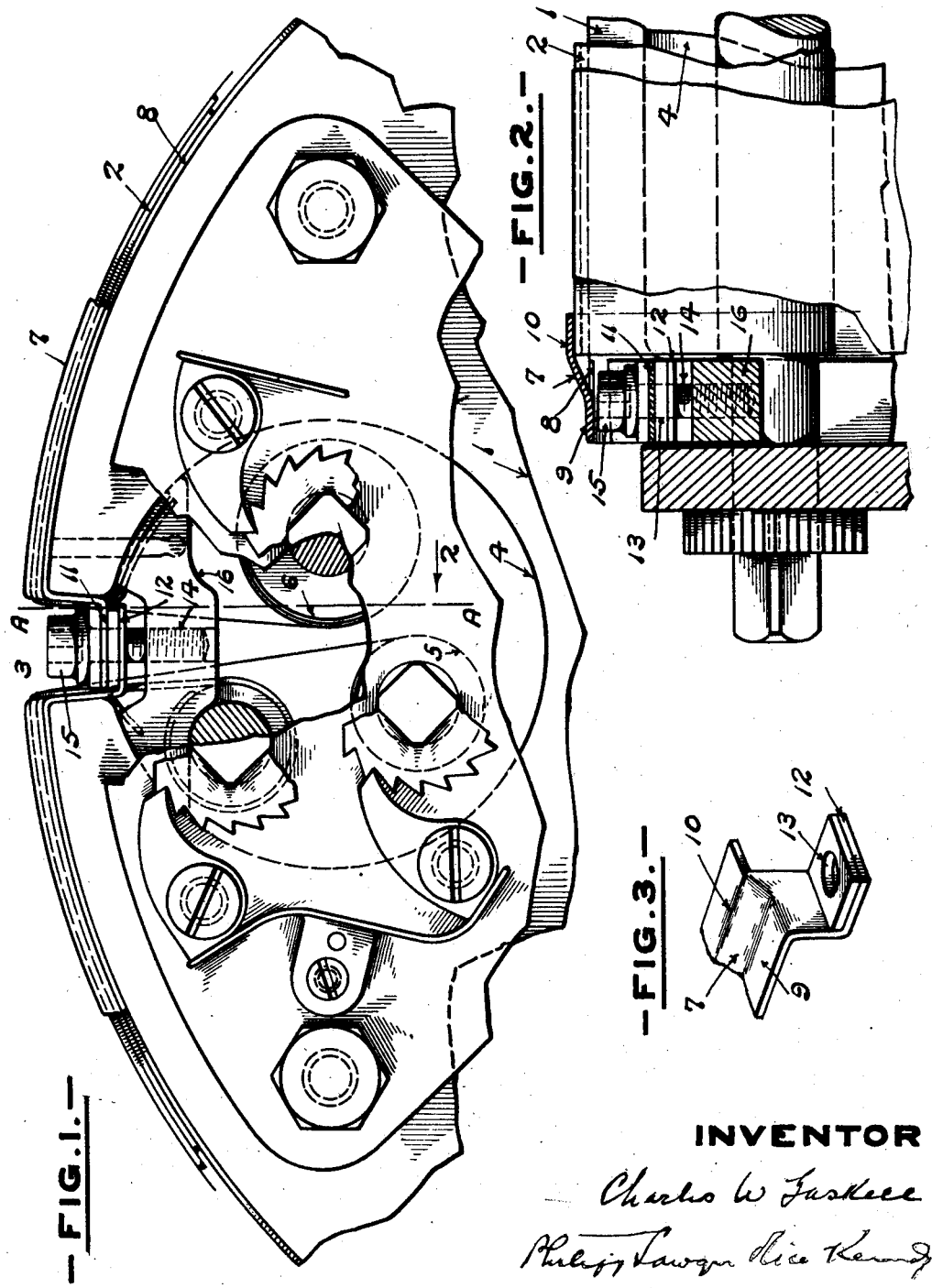
INVENTOR
Charles W. Gaskell
ATTYS Patented Apr. 16, 1929.

1,709,394

UNITED STATES PATENT OFFICE.

CHARLES W. GASKELL, OF NEW YORK, N. Y., ASSIGNOR TO R. HOE & CO., INC., OF NEW YORK, N. Y., A CORPORATION OF NEW YORK.

OIL GUARD FOR IMPRESSION CYLINDERS.

Application filed September 22, 1927. Serial No. 221,229.

This invention relates to certain improvements in means for preventing oil or grease from getting on the blankets of impression cylinders.

It is the especial object of the invention to provide an oil or grease guard of simple form which will extend over the edge of the blanket and prevent access of oil or grease thereto which may be readily secured in place on the cylinder and be removed therefrom. It is a further object of the invention to provide such a guard that will not interfere with the operation of the blanket adjusting mechanism.

With these and other objects not specifically referred to the invention consists in certain novel parts, arrangements and combinations which will be described in connection with the accompanying drawings and the novel features pointed out in the claims hereunto appended.

In these drawings—

Figure 1 is an end view partly broken away and partly in section of so much of a blanket cylinder as is necessary to show the invention;

Figure 2 is a detail sectional view, the section being taken on line A—A of Fig. 1, looking in the direction of the arrow; and Figure 3 is a perspective view of one end of the improved guard.

Referring now to these drawings a portion of one end of an impression cylinder is shown illustrating the invention, this cylinder being marked 1, and the cylinder blanket 2. The cylinder is provided with the usual narrow opening 3 through which the ends of the blanket pass to the recess 4 formed in the cylinder walls. Located in this recess are the ratchet controlled rolls 5, 6 by which the blanket may be tightened as desired, these parts being of the usual construction.

In accordance with the invention there is provided a guard for preventing the access of oil and grease to the blanket. While the particular construction of this guard may vary, it will include a member or part which will extend over the edges of the blanket, with means for securing the guard on the cylinder. In the construction shown this guard is in the form of a metal band or ring 7 which extends around a reduced end 8 of the cylinder. The shape of this guard may be varied, but it will include a part which extends over the edge of the blanket. In the specific embodiment of the guard shown it is formed with a flange 9 which embraces the cylinder, from which projects upwardly and inwardly a flange 10, the outer edge of which overlaps onto the edge of the blanket as clearly shown in Fig. 2.

This guard may be secured on the cylinder in various ways. In the preferred construction the guard will be clamped in position so as to tightly surround the cylinder end. As shown the guard ring is split and the ends are provided with inwardly extending feet 11, 12, which lap over each other and are provided with holes 13. These feet extend into and below the opening 3 in the cylinder and are clamped in position with a screw bolt 14 which is threaded into an aperture in a bridge piece 16 which engages the inner wall of the recess 4 before referred to. The bolt 14 has a recessed head 15 to receive a suitable tool, as a wrench, by which the parts may be clamped in position.

As the cylinder rotates any oil which may work around the end of the cylinder from the bearings flows onto this guard and is thrown off the guard by the spin of the cylinder before it reaches the blanket, thus keeping the blanket free of oil. Only one guard is shown, but it will be understood that a guard will be provided on each end of the cylinder.

With the construction shown a simple and efficient construction has been provided for the purpose intended, and one which may readily be put in place and removed, and which does not interfere with the adjustment of the blanket. While the invention has been shown and described in its preferred form, it will be understood that certain changes may be made in the specific form of the guard and in the means for securing it in place without departing from the invention as defined in the appended claims.

What I claim is:

1. The combination of a cylinder having a blanket, a guard having a portion coextensive with and overlapping the edge of the blanket, and means for securing the guard on the cylinder.

2. The combination of a cylinder having a blanket, a guard having a flange engaging the end of the cylinder and a flange coextensive with and overlapping the edge of the blanket, and means for detachably securing the guard on the cylinder.

3. The combination of a cylinder having a blanket, a guard ring having a flange engaging the end of the cylinder and a flange coextensive with and projecting upwardly and inwardly toward the edge of the blanket and means for securing the guard on the cylinder.

4. The combination of a cylinder having a blanket, a split guard having a flange engaging the cylinder and a flange projecting inwardly toward the edge of the blanket, feet on the ends of the flange, and means for clamping the feet together.

5. The combination of a cylinder having a blanket, a guard having a flange coextensive with and overlapping the edge of the blanket, and blanket adjusting means for adjusting the blanket beneath the guard.

6. The combination of a cylinder having a blanket, and a guard having a portion coextensive with and extending above the edge of the blanket for the purpose specified.

7. The combination of a cylinder having a blanket, a split guard ring surrounding the end of the cylinder and having a flange overlapping the edge of the blanket, and means for clamping the ends of the ring together.

8. The combination of a cylinder having a blanket, a guard having a portion carried by the cylinder and a portion coextensive with and of greater diameter than the blanket and acting to prevent access of oil thereto.

In testimony whereof, I have hereunto set my hand.

CHARLES W. GASKELL.